(12) United States Patent
Leobandung et al.

(10) Patent No.: US 10,315,933 B1
(45) Date of Patent: Jun. 11, 2019

(54) PRESSURE DIFFERENTIAL WATER DISTILLER

(71) Applicants: Effendi Leobandung, Stormville, NY (US); Nathan Samuel Leobandung, Stormville, NY (US)

(72) Inventors: Effendi Leobandung, Stormville, NY (US); Nathan Samuel Leobandung, Stormville, NY (US)

(*) Notice: Subject to any disclaimer, the term of this patent is extended or adjusted under 35 U.S.C. 154(b) by 0 days.

(21) Appl. No.: 15/912,338

(22) Filed: Mar. 5, 2018

(51) Int. Cl.
*C02F 1/04* (2006.01)
*B01D 5/00* (2006.01)
*B01D 1/28* (2006.01)
*C02F 1/26* (2006.01)
*B01D 3/10* (2006.01)

(52) U.S. Cl.
CPC .............. *C02F 1/265* (2013.01); *B01D 3/10* (2013.01); *B01D 1/28* (2013.01); *B01D 5/006* (2013.01); *B01D 5/0057* (2013.01); *B01D 2311/103* (2013.01); *B01D 2311/14* (2013.01); *C02F 1/04* (2013.01); *C02F 1/041* (2013.01)

(58) Field of Classification Search
CPC ...... B01D 1/0035; B01D 1/28; B01D 1/2803; B01D 3/10; B01D 3/101; B01D 3/103; B01D 3/105; B01D 3/106; B01D 5/006; B01D 5/0057; C02F 1/04–1/18
See application file for complete search history.

(56) References Cited

U.S. PATENT DOCUMENTS

| | | | | |
|---|---|---|---|---|
| 2,339,862 A * | 1/1944 | Kleinschmidt | .......... | B01D 1/28 159/24.3 |
| 8,668,812 B2 * | 3/2014 | Simpson | ................. | C02F 1/048 202/185.1 |
| 9,352,981 B2 * | 5/2016 | Simpson | ................. | C02F 1/048 |
| 2003/0132097 A1 * | 7/2003 | Kenet | ...................... | B01D 1/28 203/11 |
| 2004/0084357 A1 * | 5/2004 | Nagler | ..................... | B01D 1/28 210/85 |
| 2012/0273337 A1 * | 11/2012 | Wofsey | ................ | B01D 1/0035 203/10 |
| 2016/0368784 A1 * | 12/2016 | Haynes | ................... | C02F 1/042 |

\* cited by examiner

*Primary Examiner* — Jonathan Miller
*Assistant Examiner* — Jonathan Luke Pilcher

(57) ABSTRACT

A structure for efficient water desalination, where as the evaporation chamber is at low pressure, and the condensation chamber is at high pressure. The evaporation chamber is connected to the condensation via a pump to pump the water vapor from evaporation chamber to condensation chamber.

5 Claims, 5 Drawing Sheets

PRESSURE DIFFERENTIAL WATER DISTILLER

BACKGROUND

Distillation is one of the main methods to generate potable water from sea water. The main concept of distillation is sea water is heated to evaporate the water and then the water vapor is cooled to condense to produce fresh water. Since boiling temperatures of other contaminant such as salt, metals are very high, they will not be incorporated in the water vapor and will be left in the remaining solution. The fresh water is collected and piped to a container for usage. The remaining waste brine sea water is periodically refreshed.

Many variations of desalination process exist. For example, multi stage flash desalination reuses the energy into the water vapor to heat incoming sea water; therefore saving cost and energy in the process. However, this system is quite expensive and difficult to scale into smaller units. Vacuum desalination employs low pressure to enhance evaporation rate. This will also increase rate of desalination at the expense of energy needed to pump the chamber. Reverse osmosis desalination employs very high pressure of several hundred psi through a membrane to remove salt from the water. This system is scalable and likely more energy efficient than heat-based desalination; however, the system needs complex maintenance such as membrane changes and also vessels that can withstand such as high pressure.

In emergency desalination systems, such as that used in life rafts and survival kits, a very difference requirement exists. For example, a system that requires a significant heat source such as flash desalination may not be practical as emergency fuel sources quickly run out. Bulky and heavy Reverse Osmosis is also not practical as it is too heavy to carry around and will require significant electricity which is usually not available in emergency situations. A person needs a minimum of around 500 ml to 1 liter of water to survive a day. Any emergency desalination system has to provide close to that amount per day. Some solar desalination systems can provide that amount in ideal situation, but to provide consistent and sufficient water, especially for multiple survivors is indeed difficult.

Therefore, there is a need to invent a desalination system that is energy efficient, low cost, has higher conversion rate of vapor to water, and is scalable from a very large system to a portable system used in emergency.

SUMMARY

According to one embodiment of the present invention, a structure for efficient desalination having at least two chambers, where one chamber preforms evaporation of salt water at lower pressure or vacuum, and another chamber preforms condensation of the water vapor from the first chamber at higher pressure.

According to one embodiment of the present invention, a structure for efficient desalination having at least two chambers, where one chamber preforms evaporation of salt water at lower pressure or vacuum, and another chamber preforms condensation of the water vapor from the first chamber at higher pressure, where the second chamber has a pressure release valve to maintain constant high pressure in the second chamber.

According to one embodiment of the present invention, a structure for efficient desalination having at least two chambers, where one chamber preforms evaporation of salt water at lower pressure or vacuum, and another chamber preforms condensation of the water vapor from the first chamber at higher pressure, where the second chamber has a pressure release valve to maintain constant high pressure in the second chamber, and where the second chamber consists of a flexible shape vessel made from material like rubber

DETAILED DESCRIPTION

The descriptions of the various embodiments of the present invention have been presented as examples and are not intended to be exhaustive or limited to the embodiments disclosed. The scope of the present disclosure is not limited to specific described embodiments. Instead, any combination of the features and elements, whether related to different embodiments or not, is contemplated to implement and practice contemplated embodiments.

Figure 1:
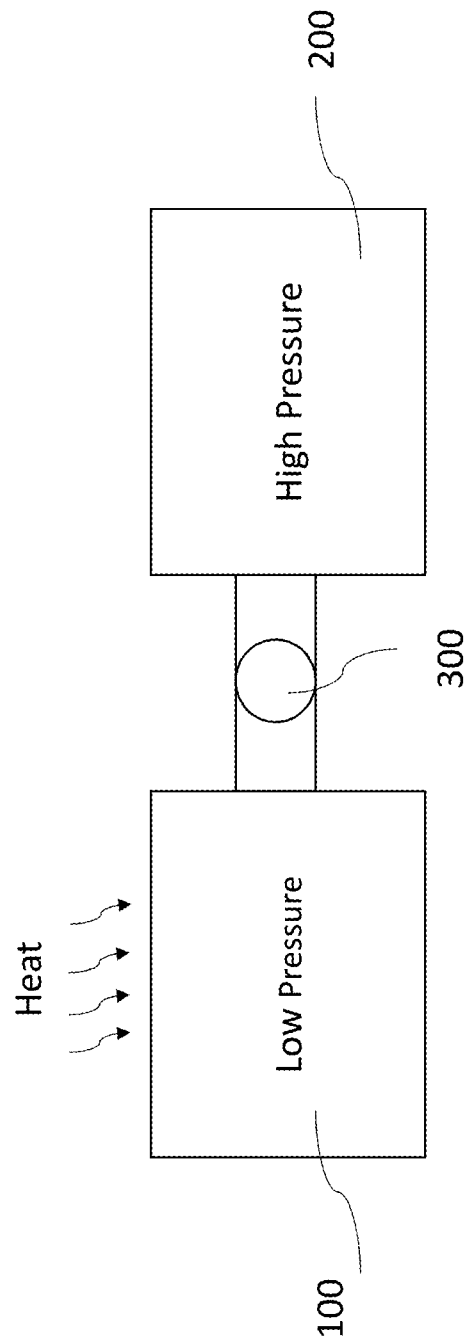
FIG. 1 shows the schematic of the structure with 2 chambers for evaporation and condensation respectively.

FIG. 1 illustrates the schematic of the structure reported in this invention. The structure consists of two chambers 100 and 200 and is connected by a pump 300. The chamber 100 is the evaporation chamber where it is heated using a heat source such as solar energy, furnace, etc. The pump 300 pumps the resulting water vapor that is evaporated from evaporation chamber 100 to condensation chamber 200. The pressure in evaporation chamber is kept low because of the pump to enhance evaporation, and the pressure in condensation chamber is kept high to enhance condensation. In principle the evaporation rate depends on rate of impingement of water vapor into the chamber wall and therefore, is proportional to the chamber pressure.

Figure 2:
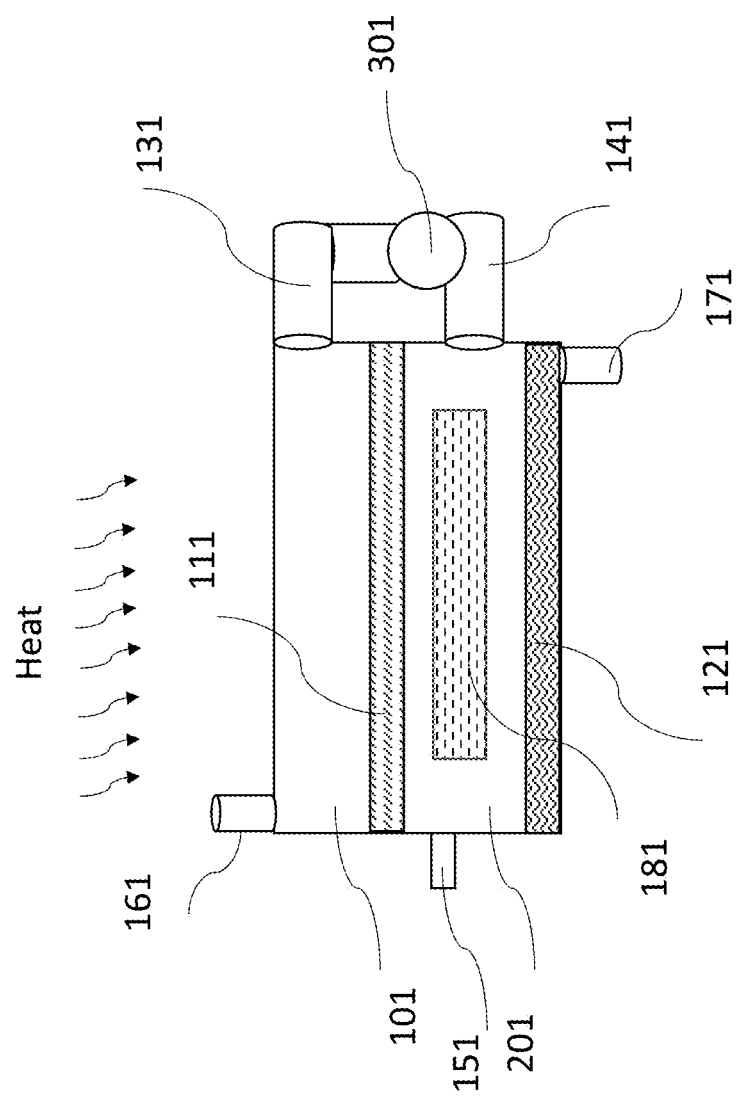
FIG. 2 illustrates the structures with 2 chambers including a pump between the 2 chambers and a pressure release valve in the second chamber.

FIG. 2 illustrate the example structure as describe in the embodiment. Salt water 111 enters some into evaporation chamber 101 through an opening 161. The chamber 101 can be transparent to allow solar heat to enter, or another heat source can be used. The opening 161 should be sealed once the salt water enters, since chamber 101 will be under low pressure or vacuum. As the water vapor evaporates, it will be pumped into the condensation chamber 201 using one-way pump 301 from opening 131 in chamber 101 to opening 141 in chamber 201. Low pressure or vacuum on evaporation chamber 101 will enhance evaporation and high pressure on condensation chamber 201 will enhance condensation. Pressure in the range of 30 to 100 psi is desirable on chamber 201 although other pressure is also possible. An over pressure valve 151 can be used to control the pressure in chamber 201 so that a constant pressure is maintained. The condensed fresh water 121 is collected on the bottom of the condensation chamber and can be released through opening 171. It is an option to introduce a structure 181 to increase the surface area of chamber 201 to further improve condensation rate. Although a two chambers structure is shown here, it is understandable for someone skilled in the art that multiple chambers with multiple pressures can be employed to further enhanced the condensation rate.

Figure 3:
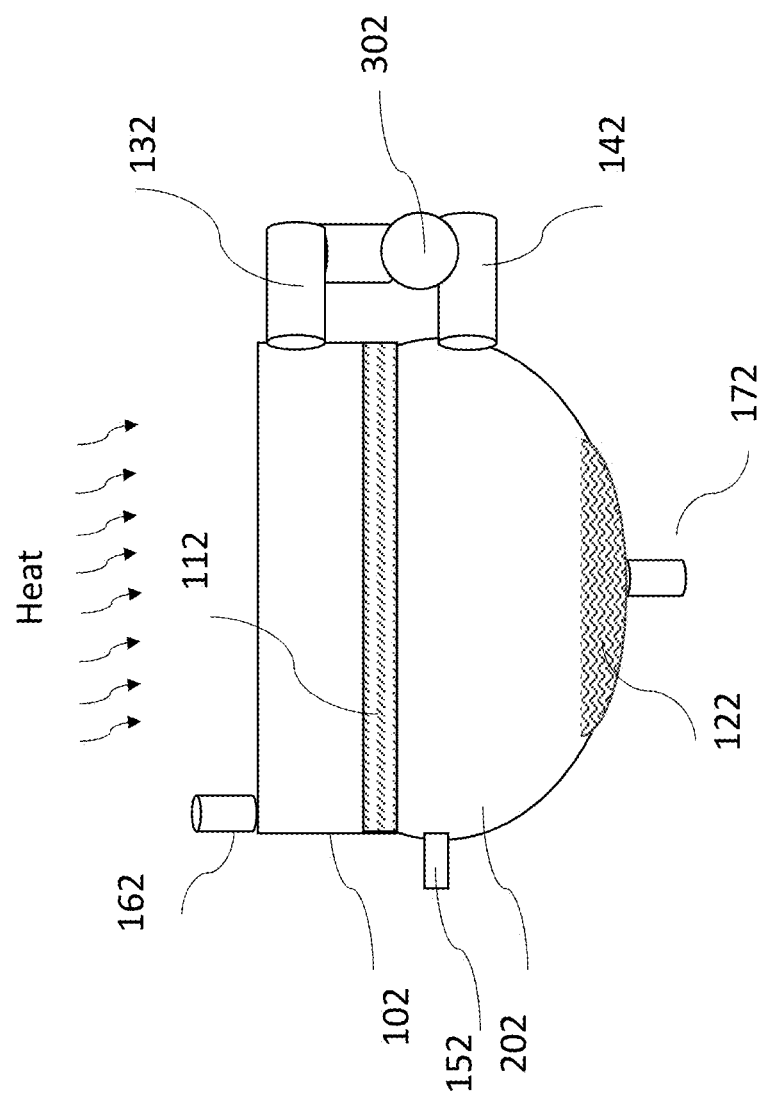
FIG. 3 illustrates the structures with 2 chambers including a pump between the 2 chambers and a pressure release valve in the second chamber and is made of flexible materials.

FIG. 3 shows another embodiment of the invention. The evaporation chamber 102 is again filled with sea water 112 through opening 162. A pump 302 pumps the water vapor through opening 132 in chamber 102 to opening 142 in chamber 202. An over pressure valve 152 is used to stabilize the pressure in condensation chamber 202, and resulting fresh water is expelled from opening 172. In this case, chamber 202 can be made from flexible material, such as rubber, which is collapsible to save space during storage. For emergency desalination system, low weight and volume is important, and the collapsible chamber 202 becomes important.

Figure 4:
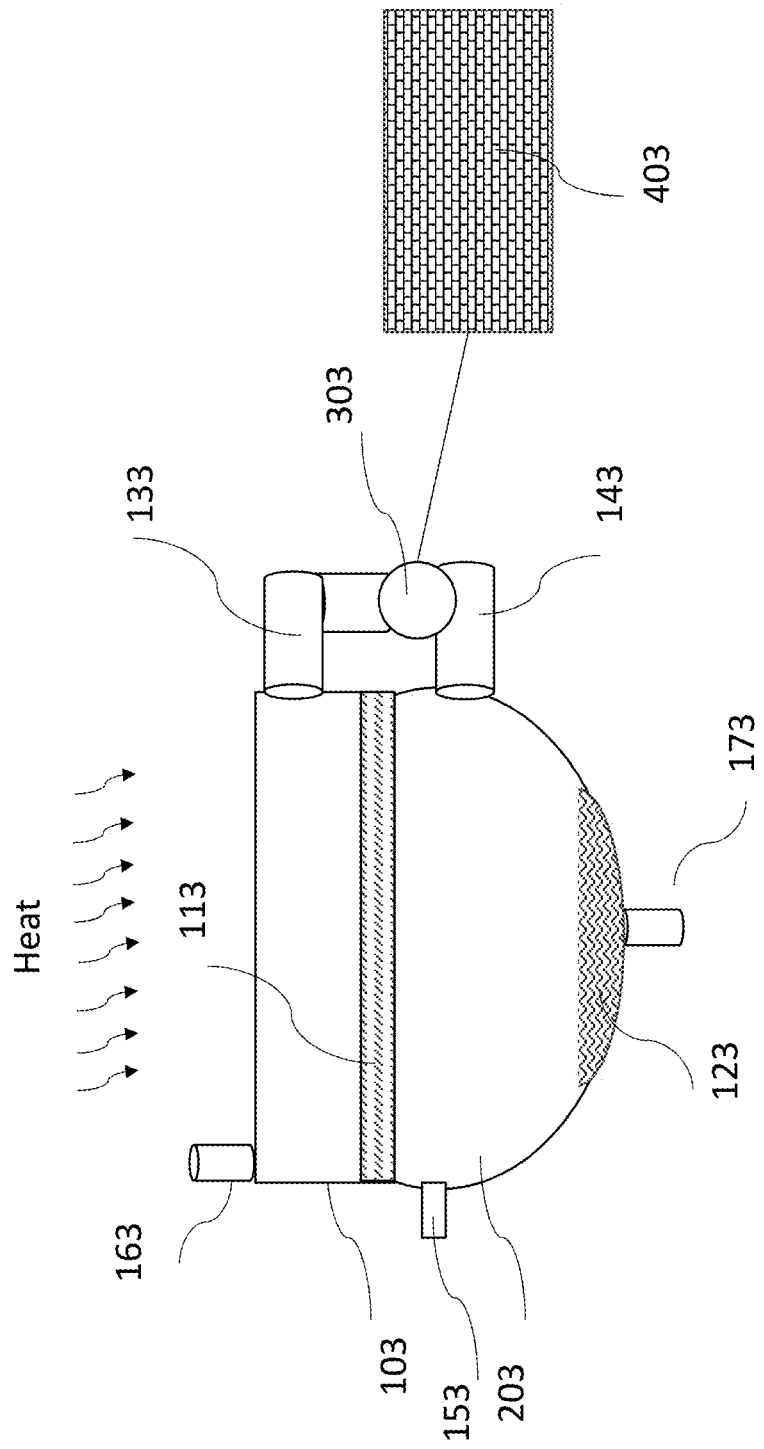
FIG. 4 illustrates the structure with 2 chambers with a pump between the 2 chambers and a solar panel used to power the pump.

FIG. 4 shows another embodiment of the invention. The evaporation chamber 103 is again filled with sea water 113 through opening 163. A pump 303 pumps the water vapor through opening 133 in chamber 103 to opening 143 in chamber 203. An over pressure valve 153 is used to stabilize the pressure in condensation chamber 203, and resulting fresh water is expelled from opening 173. In this case, chamber 202 can be made from flexible material such as rubber which is collapsible to save space during storage. For emergency water desalination system, the pump 303 can be hand operated or solar powered using solar cell 403.

Figure 5:
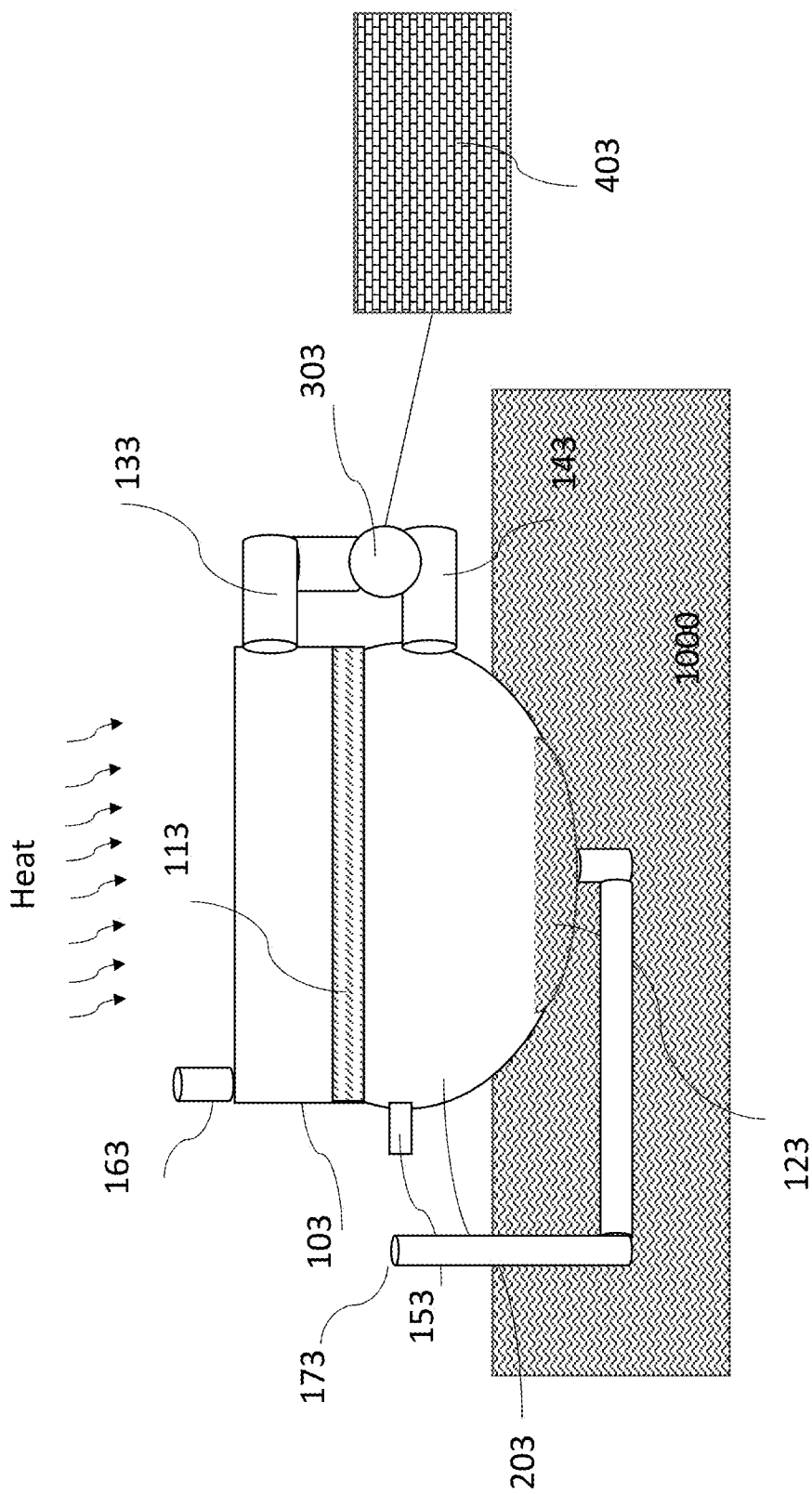
FIG. 5 illustrates the structure with 2 chambers with a pump between the 2 chambers and a solar panel used to power the pump, wherein the condensation chamber is cooled.

FIG. 5 shows another embodiment of the invention. The evaporation chamber 104 is again filled with sea water 114 through opening 164. A pump 304 pumps the water vapor through opening 134 in chamber 104 to opening 144 in chamber 204. An over pressure valve 154 is used to stabilize the pressure in condensation chamber 204, and resulting fresh water is expelled from opening 174. The pump 304 can be operated using a solar panel to generate electric power. The condensation chamber 204 can also be cooled down to improve condensation rate. For example, in the sea environment, the entire condensation chamber can be submerged in the sea water to cool it down.

While the previous description is directed to embodiments of the present invention, other and further embodiments of the invention may be devised without departing from the basic concept determined by the claims that follow.

What is claimed is:

1. A structure for emergency water desalination, comprising:
   At least two chambers, where the first chamber is a sealed evaporation chamber configured to operate at lower than atmospheric pressure,
   where the second chamber is a sealed condensation chamber configured to operate at higher than atmospheric pressure,
   where the first and second chamber are connected with a pump configured to pump water vapor from the first chamber to the second chamber,
   wherein the second chamber comprises an over pressure valve to control and maintain pressure within the second chamber at a constant level above atmospheric pressure, and
   wherein the second chamber is under the first chamber, such that it is capable of being cooled by immersion in an outside body of water, to improve condensation rate.

2. The structure of claim 1, wherein the first chamber has an opening that is sealed during heating, and water is heated up to generate water vapor under low pressure or vacuum.

3. The structure in claim 1, wherein the second chamber comprises a separate discharge outlet to discharge purified water.

4. The structure in claim 1, wherein the second chamber is made from flexible materials.

5. The structure in claim 1, wherein the pump is powered by a solar cell.

* * * * *